(12) United States Patent
Laursen

(10) Patent No.: US 9,692,340 B2
(45) Date of Patent: Jun. 27, 2017

(54) VARIABLE TORQUE ANGLE FOR ELECTRIC MOTOR

(71) Applicant: Danfoss Drives A/S, Graasten (DK)

(72) Inventor: Michael Laursen, Kolding (DK)

(73) Assignee: Danfoss Drives A/S, Graasten (DK)

( * ) Notice: Subject to any disclaimer, the term of this patent is extended or adjusted under 35 U.S.C. 154(b) by 0 days.

(21) Appl. No.: 14/407,500

(22) PCT Filed: Jun. 11, 2013

(86) PCT No.: PCT/DK2013/000037
§ 371 (c)(1),
(2) Date: Dec. 12, 2014

(87) PCT Pub. No.: WO2013/185761
PCT Pub. Date: Dec. 19, 2013

(65) Prior Publication Data
US 2015/0115850 A1    Apr. 30, 2015

(30) Foreign Application Priority Data

Jun. 15, 2012 (GB) .................................. 1210706.6

(51) Int. Cl.
*H02P 21/00* (2016.01)
*H02P 21/14* (2016.01)
(Continued)

(52) U.S. Cl.
CPC ........ *H02P 21/148* (2013.01); *H02P 21/0003* (2013.01); *H02P 21/06* (2013.01);
(Continued)

(58) Field of Classification Search
CPC ...... H02P 25/06; H02P 6/006; H02P 21/0053; H02P 21/146; H02P 2203/11;
(Continued)

(56) References Cited

U.S. PATENT DOCUMENTS 6,188,196 B1 * 2/2001 Koide .................. B60L 11/123
318/432
6,646,409 B2   11/2003 Won et al.
(Continued)

FOREIGN PATENT DOCUMENTS

CN    1437791 A    8/2003
CN    1489278 A    4/2004
(Continued)

OTHER PUBLICATIONS

International Search Report for PCT Serial No. PCT/DK2013/000038 dated Apr. 22, 2014.
(Continued)

*Primary Examiner* — Paul Ip
(74) *Attorney, Agent, or Firm* — McCormick, Paulding & Huber LLP

(57) ABSTRACT

A method for controlling an electric motor (such as a synchronous reluctance electric motor) is suggested, in which the torque angle in the d-q-reference frame is at least in part and/or at least at times varied depending on at least one working condition of the electric motor.

14 Claims, 4 Drawing Sheets

(51) Int. Cl.
*H02P 21/06* (2016.01)
*H02P 21/20* (2016.01)
*H02P 25/024* (2016.01)
*H02P 25/092* (2016.01)

(52) U.S. Cl.
CPC ............ *H02P 21/20* (2016.02); *H02P 25/024* (2016.02); *H02P 25/092* (2016.02)

(58) Field of Classification Search
CPC .......... H02P 6/183; H02P 6/185; H02P 21/18; H02P 21/14; H02P 6/18; H02P 21/32; H02P 2203/09; H02P 2207/05; H02P 21/24; H02P 21/26; H02P 25/08; H02P 27/08; H02P 21/0025; H02P 21/06
USPC ............................ 318/400.02, 701, 801, 807
See application file for complete search history.

(56) References Cited

U.S. PATENT DOCUMENTS

| | | | | |
|---|---|---|---|---|
| 6,650,083 | B2 | 11/2003 | Jung | |
| 7,005,828 | B2* | 2/2006 | Karikomi | H02P 6/185 318/727 |
| 7,071,651 | B2* | 7/2006 | Toyozawa | H02P 6/183 318/801 |
| 7,170,283 | B2* | 1/2007 | Toyozawa | H02P 1/46 318/700 |
| 7,276,877 | B2* | 10/2007 | Qiu | H02P 21/13 318/453 |
| 7,504,797 | B2* | 3/2009 | Tomigashi | H02P 21/18 318/727 |
| 7,772,790 | B2* | 8/2010 | Nashiki | H02K 1/145 318/400.02 |
| 7,816,822 | B2* | 10/2010 | Nashiki | H02K 1/145 310/185 |
| 7,898,197 | B2* | 3/2011 | Tomigashi | H02P 21/10 318/400.02 |
| 7,919,900 | B2* | 4/2011 | Kusase | H02K 21/044 310/263 |
| 7,932,692 | B2* | 4/2011 | Inokuma | H02P 21/14 318/432 |
| 7,969,103 | B2* | 6/2011 | Sepe, Jr. | H02P 25/06 318/135 |
| 7,986,117 | B2* | 7/2011 | Yamamoto | B60L 15/025 318/400.02 |
| 8,018,185 | B2* | 9/2011 | Yamamoto | B60L 15/025 318/400.02 |
| 8,067,874 | B2* | 11/2011 | Kusase | H02K 21/044 310/263 |
| 8,159,161 | B2* | 4/2012 | Tomigashi | H02P 6/183 318/400.01 |
| 8,174,220 | B2* | 5/2012 | Inoue | B60L 11/14 318/400.01 |
| 2001/0002784 | A1* | 6/2001 | Masaki | H02P 6/18 318/727 |
| 2001/0024100 | A1* | 9/2001 | Shinnaka | H02P 21/12 318/701 |
| 2001/0028236 | A1* | 10/2001 | Cheong | H02P 25/08 318/701 |
| 2002/0043953 | A1* | 4/2002 | Masaki | B60L 11/14 318/700 |
| 2003/0062869 | A1 | 4/2003 | Ieoka | |
| 2003/0128009 | A1* | 7/2003 | Sakurai | H02P 6/18 318/722 |
| 2004/0100222 | A1* | 5/2004 | Karikomi | H02P 6/185 318/801 |
| 2005/0007044 | A1* | 1/2005 | Qiu | H02P 21/13 318/400.02 |
| 2005/0104582 | A1* | 5/2005 | Toyozawa | H02P 1/46 324/207.25 |
| 2005/0110452 | A1* | 5/2005 | Toyozawa | H02P 6/183 318/807 |
| 2005/0212471 | A1* | 9/2005 | Patel | H02P 21/08 318/432 |
| 2007/0046249 | A1* | 3/2007 | Tomigashi | H02P 21/18 318/807 |
| 2008/0111516 | A1* | 5/2008 | Inokuma | H02P 21/14 318/799 |
| 2008/0129243 | A1* | 6/2008 | Nashiki | H02K 1/145 318/701 |
| 2008/0284360 | A1* | 11/2008 | Sepe, Jr. | H02P 6/006 318/135 |
| 2009/0026988 | A1* | 1/2009 | Tomigashi | H02P 21/10 318/400.02 |
| 2009/0026997 | A1* | 1/2009 | Satake | H02P 25/08 318/701 |
| 2009/0218907 | A1* | 9/2009 | Kusase | H02K 21/044 310/263 |
| 2009/0236930 | A1* | 9/2009 | Nashiki | H02K 1/145 310/257 |
| 2009/0237014 | A1* | 9/2009 | Yamada | H02P 21/16 318/400.02 |
| 2009/0237021 | A1* | 9/2009 | Yamamoto | B60L 15/025 318/400.15 |
| 2009/0237022 | A1* | 9/2009 | Yamamoto | B60L 15/025 318/400.26 |
| 2009/0322264 | A1* | 12/2009 | Imura | B60L 15/025 318/400.09 |
| 2010/0045218 | A1* | 2/2010 | Tomigashi | H02P 6/183 318/400.02 |
| 2010/0156330 | A1* | 6/2010 | Inoue | B60L 11/14 318/400.02 |
| 2011/0031909 | A1 | 2/2011 | Ohgushi | |
| 2011/0084634 | A1* | 4/2011 | Kusase | H02K 21/044 318/400.02 |
| 2011/0248659 | A1* | 10/2011 | Balazovic | H02P 6/183 318/400.33 |
| 2011/0298403 | A1* | 12/2011 | Yamamoto | B60L 15/025 318/400.02 |
| 2011/0304286 | A1* | 12/2011 | Sepe, Jr. | H02P 25/06 318/135 |
| 2011/0307232 | A1* | 12/2011 | Sepe, Jr. | H02P 25/06 703/13 |
| 2012/0119686 | A1 | 5/2012 | Bertotto et al. | |
| 2012/0123715 | A1* | 5/2012 | Eskola | G01R 31/34 702/65 |
| 2012/0206077 | A1* | 8/2012 | Yoneshima | H02P 6/185 318/400.33 |
| 2012/0217849 | A1* | 8/2012 | Aoki | H02P 6/18 310/68 D |
| 2013/0257324 | A1* | 10/2013 | Maekawa | H02P 21/14 318/400.02 |
| 2014/0285125 | A1* | 9/2014 | Kato | H02P 6/06 318/400.02 |
| 2014/0292239 | A1* | 10/2014 | Kato | H02P 21/0017 318/400.02 |
| 2014/0346983 | A1* | 11/2014 | Kato | H02P 21/0089 318/400.02 |
| 2015/0188472 | A1 | 7/2015 | Laursen | |

FOREIGN PATENT DOCUMENTS

| | | |
|---|---|---|
| CN | 1976211 A | 6/2007 |
| CN | 101383582 A | 3/2009 |
| JP | 2004-064860 A | 2/2004 |
| JP | 2006-025583 A | 1/2006 |
| KR | 2000-0046678 A | 7/2000 |

OTHER PUBLICATIONS

Ghaderi A. et al. "A Novel Implementation of Low Speed Sensorless Vector Control of Synchronous Reluctance Motors with a New Online Parameter Identification Approach", Applied Power Electronics Conference and Exposition, 2006. APEC '06, Twenty-First Annual IEEE Mar. 19, 2006, Piscataway, NJ, USA, IEEE, Piscataway, NJ, USA Mar. 19, 2006, pp. 211-217.

(56) References Cited

OTHER PUBLICATIONS

British Search Report for Application No. GB1210705.8 dated Nov. 5, 2012.
International Search Report for PCT Serial No. PCT/DK2013/000037 dated Apr. 15, 2014.
K.A. Mary et al: "A generalized approach to the design of the speed control system for inverter-driven permanent magnet synchronous motor" IET-UK International Conference on Information and Communication Technology in Electrical Sciences (ICTES 2007), Dec. 20, 2007-Dec. 22, 2007, pp. 441-447.
Ming-Tsan Lin et al.: "Design and implementation of a direct torque controlled interior permanent magnet synchronous motor drive based on a novel flux model", Power Electronics and Drive Systems (PEDS), 2011 IEEE Ninth International Conference on, IEEE, Dec. 5, 2011-Dec. 8, 2011, pp. 394-398.
Yangzhong Zhou et al.: "Research on a direct torque control for an electrically excited synchronous motor drive with low ripple in flux and torque", Frontiers of Electrical and Electronic Engineering in China, vol. 2, No. 4, Oct. 1, 2007, pp. 425-431.
Great Britain Search Report for Serial No. GB1210706.6 dated Oct. 29, 2012.
K. Alice Mary et al. "A Generalized Approach to the Design of the Speed Control System for Inverter-Driven Permanent Magnet Sychronous Motor" IET-UK International Conference on Information and Communication Technology in Electrical Sciences. Tamil Nadu, India. Dec. 20-22, 2007. p. 441-447.

\* cited by examiner

VARIABLE TORQUE ANGLE FOR ELECTRIC MOTOR

CROSS-REFERENCE TO RELATED APPLICATION

This application is entitled to the benefit of and incorporates by reference subject matter disclosed in International Patent Application No. PCT/DK2013/000037 filed on Jun. 11, 2013 and Great Britain Patent Application 1210706.6 filed Jun. 15, 2012.

FIELD OF THE INVENTION

The invention relates to a method for controlling an electric motor. Furthermore, the invention relates to a controller unit, in particular to a controller unit for an electric motor.

BACKGROUND

Electric motors are nowadays employed for a plethora of different applications in essentially all fields of technology. Depending on the actual use of the respective electric motor, various types and various sizes of electric motors are employed.

As an example, if an electric motor has to be used for an application where a constant turning speed of the electric motor can be used or is even required, a synchronous electric motor without a commutator can be used, in particular if alternating current is available. However, a start-up of such an electric motor might be difficult if a load with large moment of inertia has to be driven.

If, however, a variable turning speed of the electric motor has to be provided (and additionally in the case of a direct current source), the traditional approach was to use electric motors, comprising a commutator (so called asynchronous electric motors). A problem involved with such commutated electric machines is the commutator, since this is a component that is particularly subject to a non-negligible wear. Furthermore, when using a commutator, typically sparks occur when the electric motor is turning. Such sparks can render the resulting electric motor unusable for certain applications, in particular if flammable gases are around, unless additional precautions are taken.

With the advent of modern semiconductor-based power electronics, the use of synchronous electric motors, in particular synchronous reluctance electric motors, have become more and more widespread. With such synchronous electric motors, commutators can be dispensed with. Furthermore, by providing an alternating electric current with a variable frequency, a synchronous electric motor can be driven at essentially any rotating speed. Even changes in turning speed can be realised. This has made possible certain applications that were hard to achieve, if at all, beforehand.

With increasing number of electric motors and increasing energy prices the problem of efficiency becomes increasingly important. Efficiency does not necessarily relate only to the consumption of electric energy with respect to the mechanical power generated by the electric motor. Instead, it can also relate to the size (volume) of the electric motor that is necessary to achieve a certain mechanical power level.

Although a number of different controllers for electric motors, a variety of electric motors and a variety of methods how to drive an electric motor are known in the state of the art, there is still a necessity for further improvements.

SUMMARY

It is therefore the object of the invention to provide a method for controlling an electric motor that is improved over methods for controlling an electric motor that are known in the state of the art. It is furthermore an object of the invention to provide a controller unit, in particular a controller unit for an electric motor that is improved over controller units, known in the state of the art. Still another object of the invention is to provide an electric motor that is improved over electric motors, known in the state of the art.

The presently proposed invention seeks to address these objects.

It is suggested to perform a method for controlling an electric motor (such as a synchronous reluctance electric motor) in a way that the torque angle in the d-q-reference frame is at least in part and/or at least at times varied depending on at least one working condition of the electric motor. The d-q-reference frame is usually the reference frame of the rotating rotor that is connected to the shaft of the electric motor. It is usually not identical to the rotating magnetic field system of the stator (which is typically referred to as the so-called stator reference system and/or the x-y-system and/or the x-y-reference frame), in particular if a load is imposed on the electric motor. Typically, if the load to the electric motor is increased, the angle between the d-q-system (d-q-reference frame) and the x-y-system will increase. Typically, once an angle of 90° between the d-q-system in the x-y-system is exceeded, a normal mechanical rotation of the electric motor typically cannot be sustained any more. The d-q-system can usually be also referred to as the "mechanical orientation" of the rotating rotor with respect to the high permeance axis of the machine (the d-axis). The torque angle is usually the angle between the resulting (vectorial) stator current $i_S$ and the d-axis of the d-q-reference frame (rotor reference frame). Consequently, the fraction of the stator current $i_S$ in q-direction can be determined by the torque angle. According to the state of the art it was usually suggested to use a constant torque angle of typically essentially 45° when driving an electric motor (if any suggestion was made at all) in order to obtain maximum torque per ampere control (MTPAC) and thereby reducing the losses in stator resistance as much as possible. This angle was particularly suggested when an actuation signal for driving an electric motor using variable frequency inverters were employed. Surprisingly, the inventor realised that an improved behaviour of the electric motor can be realised if a variable torque angle is used when generating the electric current for driving the electric motor. It is suggested to choose the appropriate torque angle at least in part and/or at least at times in dependence on at least one working condition of the electric motor. Of course, in addition to this, different dependencies can be used as well, like a user input or the like (such a dependence can be used additionally and/or alternatively to a dependence on at least one working condition of the electric motor). First experiments have shown that by using a variable torque angle, a higher mechanical torque can be realised with the same electric motor. Additionally, first experiments indicate that even the power consumption of the electric motor can usually be reduced. Taken both effects in combination, a significant improvement can usually be realised.

It is suggested that at least one working condition of the electric motor is at least in part derived from a design parameter of the electric motor and/or an operational parameter, in particular an electric parameter and/or of a mechanical parameter. A design parameter of the electric motor can be particularly the layout and/or design of the electric windings of the stator and/or the rotor of the electric motor. In particular, the inductances of the respective coils (or even other parts of the electric motor) can be used for this purpose. However, even more design parameters can have an influence on at least one working condition, like the weight of the electric machine, the thickness of the wires (maximum electric current that can be applied (short-term limit/long-term limit)) or the like. As an operational parameter, in particular parameters that can only be derived when the electric motor is currently operating (for example rotating) are meant. This can be the actual current applied, the rotating speed of the electric motor, the temperature of the electric motor, the actual and/or desired torque or the like. It is possible that the respective operational parameter is derived from specially provided sensors and/or is calculated from other values (like the actuation signal that is generated for the electric motor by a controller unit itself). First experiments have shown that these working conditions usually have a particularly large influence on the size of the torque angle that should be chosen.

Preferably, the method is performed in a way that at least one working condition of the electric motor is at least in part derived from the d-q-reference frame. In principle, all types of working conditions can be chosen for this. The working condition can be measured in the d-q-system and/or transformed into the d-q-system, e.g. by calculations, as required. First experiments indicate that a particularly advanced method can be achieved if the suggested embodiment is realised.

Furthermore, it is suggested that at least one working condition of the electric motor is taken from the group, comprising required torque, at least one inductance, at least one applied electric current, at least one saturation effect, at least one inductance difference, at least one electric current difference and at least one input command. First experiments suggest that these values are of major importance when it comes to determining an optimum or at least an improved torque angle. A saturation effect, in particular an effect has to be considered where an increasing electric current will not result in a significant increase of the resulting magnetic field.

Even more preferred, it is suggested that the torque angle is at least at times and/or at least in part determined by the product of at least two working conditions of the electric motor. When the inventor tried to look for a satisfactory mathematical prescription on how to obtain an optimised torque angle, he realised that a product of two or more working conditions of the electric motor is a good way to achieve this goal. Of course, modifications of this basic formula are possible as well, like a multiplicative factor and/or offsets by adding and/or subtracting certain values (with respect to the overall result and/or to individual parameters).

Furthermore, it is suggested that the torque angle is determined, at least in part, by a product of at least one multiplicative factor and at least one working condition, preferably taken from the group, comprising an inductance, a difference in inductance, at least one electric current and at least one difference of electric currents. Such a mathematical formula for obtaining at an optimised torque angle seems to yield even better results, as first experiments have shown.

In addition, it is suggested to perform the method in a way that at least at times least one dampening function is used. Using such a dampening function, short time fluctuations can be "filtered out". Therefore, a more stable system can be achieved that is less prone to fluctuations, numerical artefacts and/or vibrations (as examples). In particular, electric noise can be filtered out, in particular electric noise that is generated by an inverter unit (if present). It is easily understandable that such a method is usually advantageous.

Furthermore it is suggested that the torque angle is varied within an interval between 45° as a lower limit and 46°, 47°, 48°, 49°, 50°, 55°, 60°, 65°, 70°, 75°, 80°, 85° and 90° as an upper limit. Although relatively wide variations for the torque angle are possible, first experiments have indicated that the "allowed range" of torque angles should be somewhat limited, in particular to the suggested upper and/or lower limits.

Another improved embodiment of the method can be achieved if a fallback value for the torque angle is used, in particular a fallback value for the torque angle of 45°, 46°, 47°, 48°, 49°, 50°, 51°, 52°, 53°, 54° or 55°. Such a torque angle can be particularly chosen in a situation, where a torque angle cannot be reasonably determined. As an example, such a situation can occur if some input data is missing (for example if a data line is broken and/or a sensor is out of order and/or if the input values produce an inconsistent picture of the situation). Using a fallback value according to the presently proposed embodiment, the efficiency of the electric motor will typically decrease. Nevertheless, an "emergency operation" is still possible so that a downtime (which is usually very expensive) can be usually avoided.

Although the suggested method can be employed quite generally, it is preferred if the method is used for driving a variable frequency electric motor and/or a synchronous electric motor and/or a permanent magnet electric motor and/or a synchronous reluctance electric motor. The use of the method for such electric motors will typically yield particular improvements.

Furthermore, a controller unit is suggested, in particular a controller unit for an electric motor is suggested that is designed and arranged in a way to perform a method according to the previous suggestions. Such a controller unit can be used for driving an electric motor. The resulting controller unit and/or the electric motor, driven by the controller unit, can show the previously described features and advantages, at least in analogy. Also, variations and improvements according to the previous description can be used for the controller unit as well, at least in analogy.

In particular it is possible that the controller unit comprises at least one inverter unit. Such inverter units are typically used for changing a direct electric current into an alternating electric current (typically of a variable frequency). Such inverter units can also be used for varying the frequency of an alternating electric current. In principle, the inverter unit can be of any design. For example DIACs, TRIACs, thyristors, IGBTs, FETs, MOSFETs or the like can be used.

Furthermore, it is suggested that the controller unit comprises at least one programmable memory device. In the programmable memory device, a method according to the previous description can be stored.

Of course, the controller unit can be designed in a variety of ways. In particular, a partially analog and/or a partially digital design is possible. In particular, programmable computer devices (for example a single-board computer) can be employed.

Furthermore, an electric motor unit, in particular a synchronous electric motor unit, preferably a synchronous reluctance electric motor unit is suggested that comprises at least one controller unit according to the previous description and/or that is designed and arranged in a way to perform a method according to the previous description. Such an electric motor unit can show the same features and advantages as previously described, at least in analogy. Furthermore, such an electric motor unit can be modified according to the previous description as well, at least in analogy.

BRIEF DESCRIPTION OF THE DRAWINGS

The present invention and its advantages will become more apparent, when looking at the following description of possible embodiments of the invention, which will be described with reference to the accompanying figures, which are showing.

DETAILED DESCRIPTION

Figure 1:
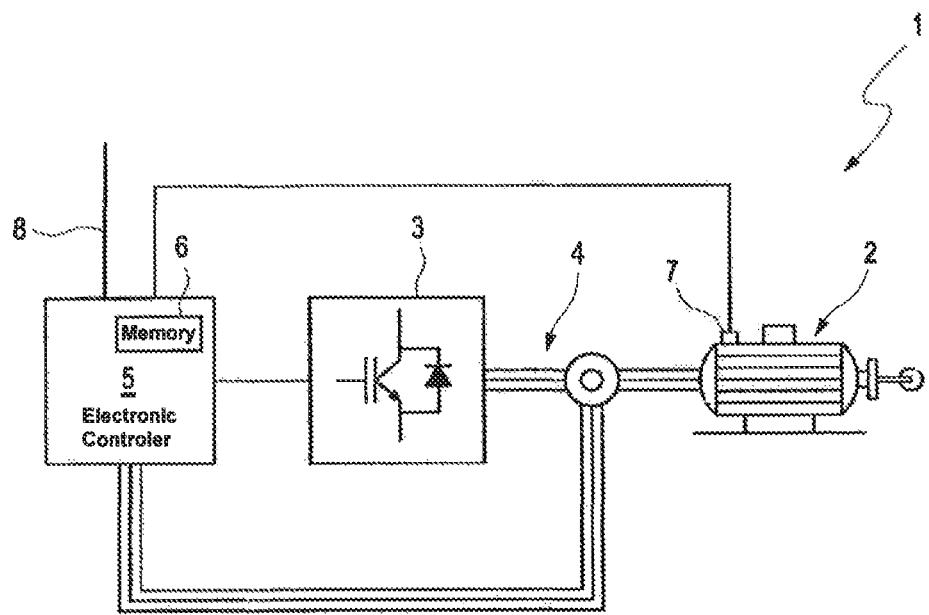
FIG. 1: is a block diagram of a possible embodiment of an electric motor unit.

In FIG. 1 a schematic block diagram of a possible embodiment of an electric motor unit 1 is shown. The electric motor unit 1 of the presently shown embodiment comprises an electric motor 2 of a synchronous reluctance motor design. The electric motor 2 is electrically driven by an inverter unit 3 that is used to provide the electric motor 2 with an electric driving current 4 of variable frequency. In the presently shown embodiment, the electric current 4, used for driving the electric motor 2 (and hence the electric current, provided by the inverter unit 3) is of a three-phase type. In the presently shown embodiment, the inverter unit 3 produces the electric driving current 4 out of a direct electric current (direct current source not shown in FIG. 1).

Furthermore, an electronic controller 5 is shown in FIG. 1 that is of a single-board computer type in the presently shown embodiment. Within the block, representing the electronic controller 5, another block is indicated that represents an electronic memory 6 in which a program for the actuation of the electric motor 2 via the inverter unit 3 is stored.

The electronic controller 5 has different data input sources. First of all, the electric driving current 4 (to be more precise: the three different phases of the electric driving current 4) are input parameters for the electronic controller 5, as indicated in FIG. 1. Additionally, some sensor data coming from sensor units 7 can be inputted into the electronic controller 5 as well (in the presently shown embodiment, sensor unit 7 is designed in connection with the electric motor 2. However, different embodiments are possible as well). In particular, it is possible to omit the use of additional sensor data and/or additional sensor units 7 essentially or even completely. In other words, usually an advantageous torque angle control can be performed in most of the cases and/or in most of the time relying solely on the measured electric current 4.

Yet another input line 8 is indicated in FIG. 1 that can be used for the input of user commands, like a requested driving speed and/or a requested output torque of the electric motor 2.

So far, electric motor units according to the state of the art were designed in a way that the torque angle 10 (see FIG. 2) was set at a constant angle of 45° in order to run maximum torque per ampere control (MTPAC) (if any desired torque angle was indicated and/or controlled at all).

Figure 2:
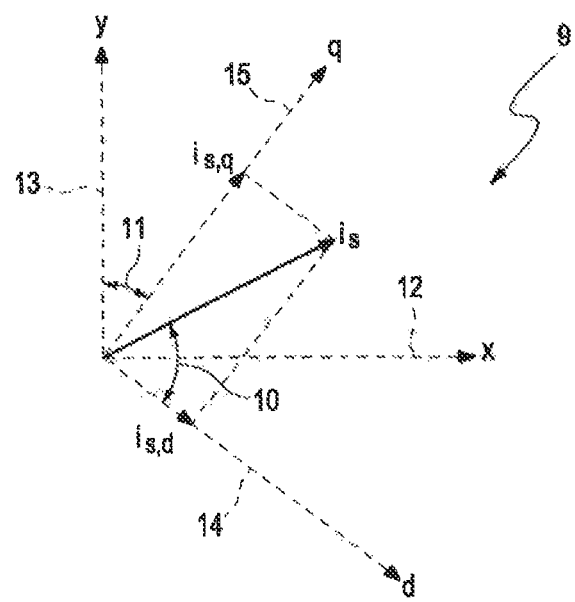
FIG. 2: is a vector diagram showing the relation between the different vectors in the different reference schemes.

In FIG. 2, the different reference schemes and the different vectorial parameters are indicated for further elucidating the invention. The x-y-reference frame (x-y-system) is created by the x-axis 12 and the y-axis 13. The x-y-system represents the coordinate system of the rotating magnetic field that is created by the stator of the electric motor 2. The x-y-system will rotate with the rotating frequency ω of the driving shaft of the electric motor 2.

The d-q-reference frame (d-q-system), spanned by the d-axis 14 and the q-axis 15 is the (also rotating) reference frame of the rotating rotor. The d-q-system rotates with the same frequency ω as the x-y-system. If a load is applied to the rotating rotor of the electric motor 2, a shift between the x-y-system and the d-q-system will usually occur. This shift will manifest itself in form of the load angle 11 (the angle between the y-axis 13 of the x-y-coordinate system and the q-axis 15 of the d-q-system).

The torque angle 10 referred to above is the angle between the applied current $i_S$ and the d-axis 14 of the d-q-system. The applied current $i_S$ can be split up into an active current $i_{sd}$ (parallel to the d-axis 14) and a reactive component $i_{sq}$, that is parallel to the q-axis 15 of the d-q-coordinate system).

According to the suggested method, the applied current $i_S$ is generated by the inverter unit 3 (under the control of the electronic controller 5) in a way that the torque angle 10 is varied in dependence on the input signals, such as the electric driving current 4 and the user input data 8.

Figure 3:
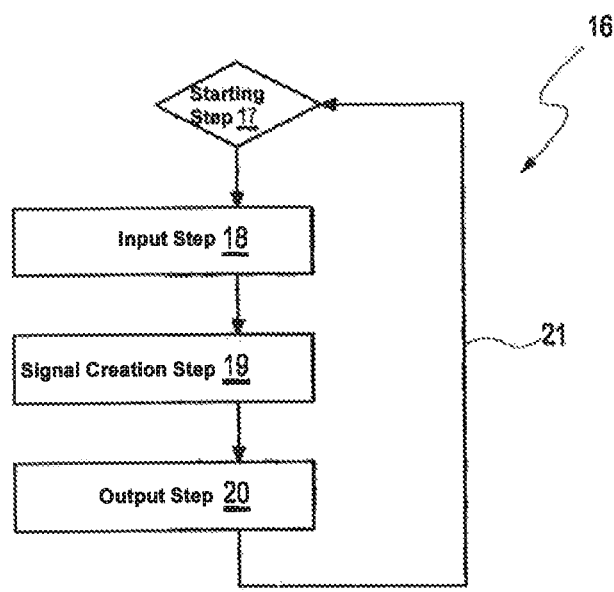
FIG. 3: shows a possible embodiment of a method of controlling an electric motor.

In FIG. 3, a schematic representation of the suggested control method 16 is shown. The control method 16 starts at starting step 17. During the starting step 17, it is possible that some "hardware" design parameters of the electric motor 2 and other devices are read in from a memory device, so that they can be used later on during the various steps of the control method 16.

Next, the various data is inputted during the input step 18. In particular, a user command, the electric condition of the electric motor 2 (for example as indicated by the electric driving current 4 that has a feedback signal part from the electric motor 2 as well) and special sensor data (created by sensor units 7, if provided) are read in.

As described in detail below, the d-axis inductance ($L_d$) and the q-axis inductance ($L_q$) of the motor 2 are particularly important to the generation of the optimum torque angle 10. Accordingly, in a preferred embodiment of the invention, values for $L_d$ and $L_q$ are inputted to the algorithm at this stage.

Based on the inputted data 18 (including the d-axis inductance ($L_d$), the q-axis inductance ($L_q$) and the stator current ($i_s$)), an optimum torque angle 10 is calculated. From this torque angle 10, the actuation signal that has to be provided by the inverter unit 3 is calculated in the signal creation step 19.

In one form of the invention, the motor 2 is controlled by controlling the d-axis current. The d-axis current ($i_{sd}$) may be given by the following formula (in which $k_t$ is the torque angle 10):

$$i_{sd} = i_S * \cos(k_t).$$

The calculated electric signal is outputted during output step 20 to the inverter unit 3. After this, the control method 16 is repeated, as indicated by the loop 21.

In the presently shown example, the resulting torque can be calculated from the formula $$k*(I_d(i_d)-I_q(i_q))*i_{sd}*i_{sq}.$$

where:

$I_d$ ($i_d$) is the d-inductance expressed as a function of d-current $I_q$ ($i_q$)) is the q-inductance expressed as a function of q-current $i_{sd}$ is the active portion of the applied current $i_s$; and $i_{sq}$ is the reactive portion of the applied current $i_s$.

Figure 4:
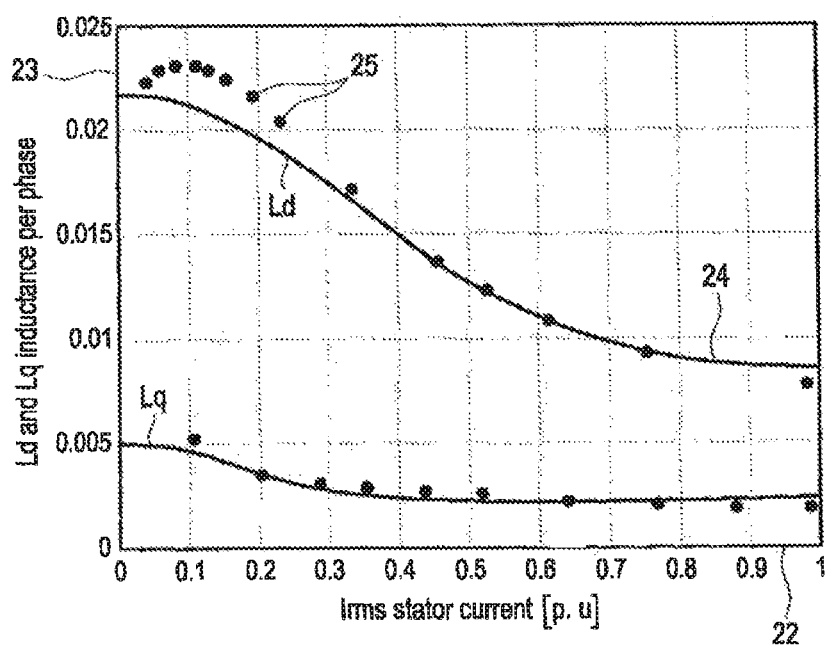
FIG. 4: is an illustration of saturation effects of a coil of an electric motor.

If any saturation effects (for example of the various electric coils within the electric motor 2) are not considered for the two inductances $I_d$ and $I_q$, an optimum control of the electric motor 2 is not possible. That such a difference between measured and calculated inductances can occur due to saturation effects can be seen from FIG. 4. In this graph, the inductance per phase (along the ordinate 23) is depicted in dependence of the stator current in relative units (along the abscissa 22) for an exemplary synchronous reluctance machine system (such as that described below with reference to FIG. 6). The dependence is shown as a solid line 24, representing the calculated inductance, while the dots 25 show the measured values. The upper plot is the d-inductance ($L_d$): the lower plot is the q-inductance ($L_q$). As can be seen from the graph of FIG. 4, a distinct discrepancy exists for the low stator current regime.

Figure 5:
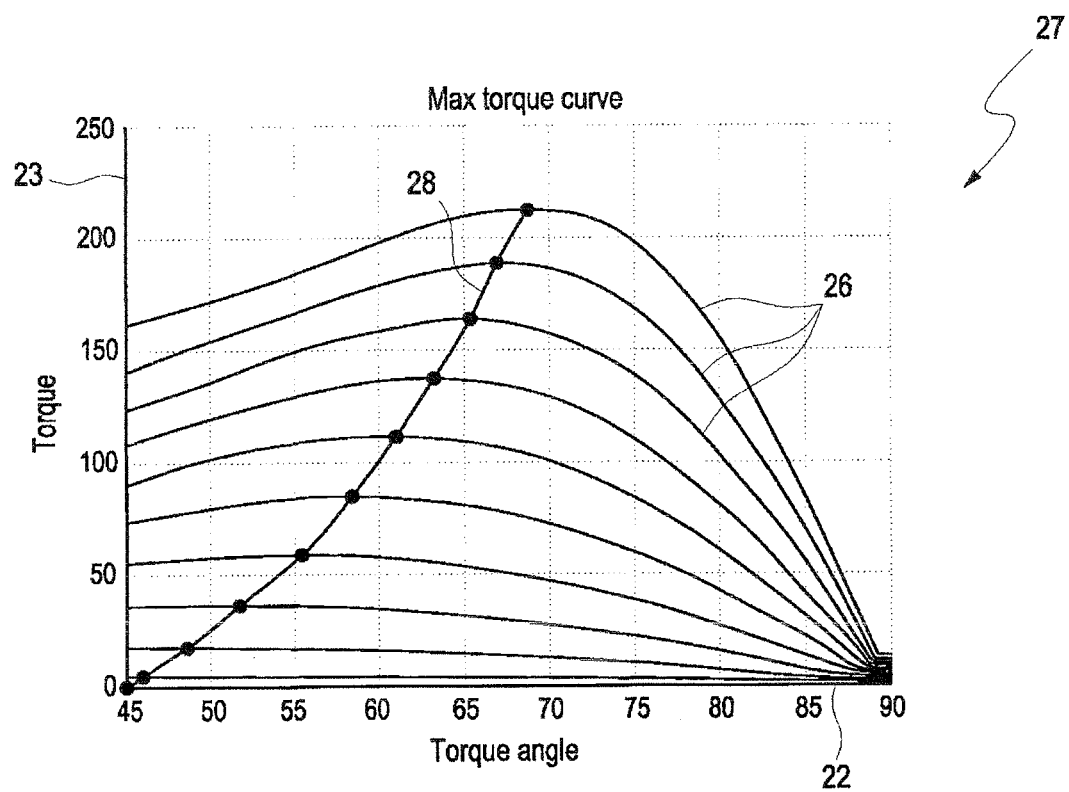
FIG. 5: shows the dependence of the torque on the torque angle for different currents.

This seems to result in a variation of the optimum torque angle to be applied when creating the electric driving current 4 of the electric motor 2. The effect of the use of different torque angles is illustrated in FIG. 5 that is showing first measurement results. The resulting torque (plotted along the ordinate 23 of FIG. 5) is indicated in dependence of the torque angle 10 (shown along abscissa 22 of FIG. 5). The individual torque angle curves 26 create a set of curves 27. The individual torque-torque angle-curves vary each other with respect to the applied current.

Furthermore, line 28 shows the optimum torque angle for driving the electric motor 2. As can be seen from FIG. 5, a variation of the torque angle in dependence of the required torque and of the applied current (and presumably in addition to this in dependence of other parameters as well) will result in a more efficient electric motor.

Figure 6:
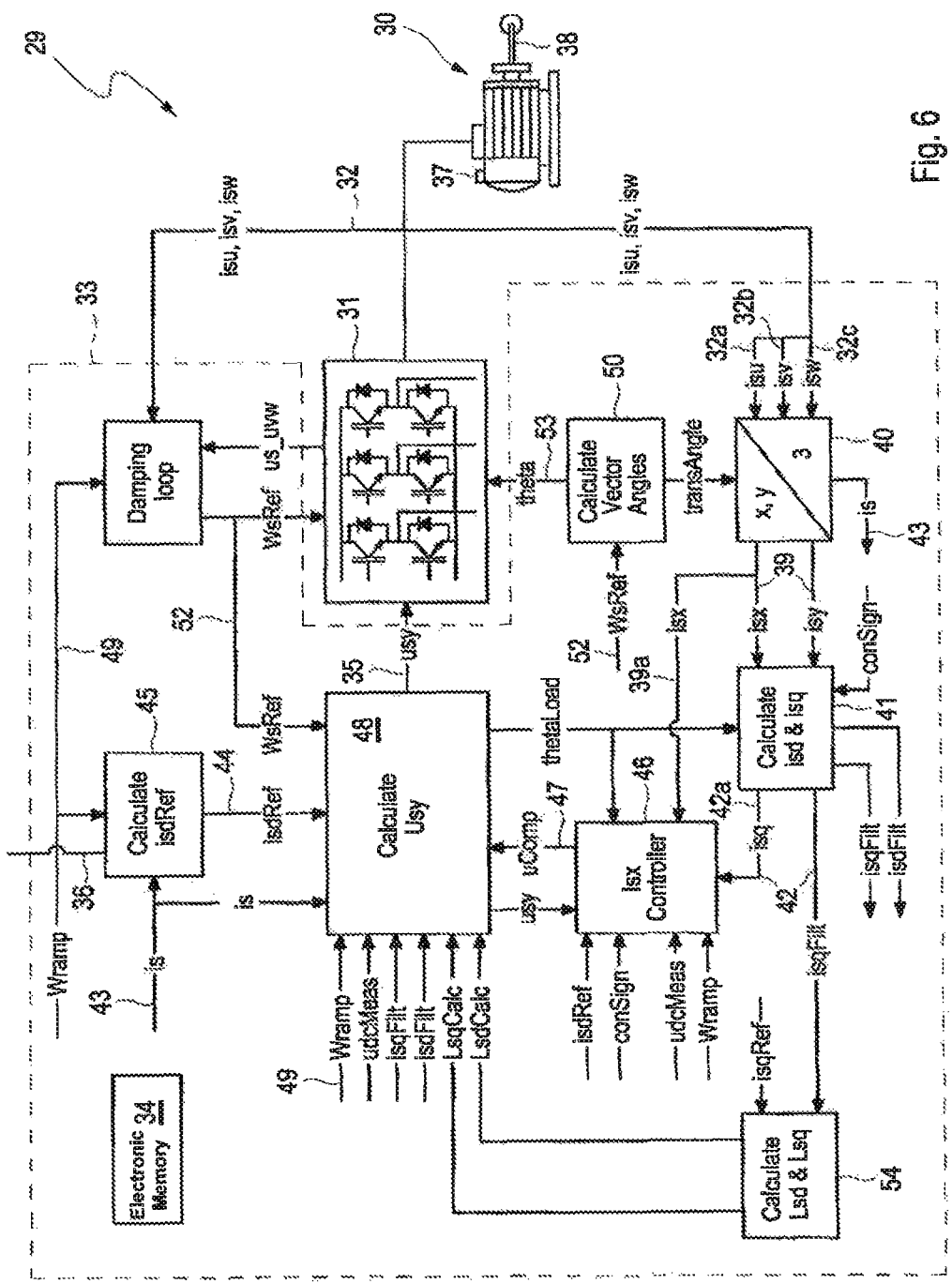
FIG. 6: is a block diagram of another possible embodiment of an electric motor unit.

In FIG. 6 a schematic block diagram of an exemplary implementation of an electric motor unit 29 in accordance with the principles of the present invention is shown. The electric motor unit 29 of the presently shown embodiment comprises an electric motor 30 of a synchronous reluctance motor design (synchronous reluctance machine). The electric motor 30 is electrically driven by an inverter unit 31 that is used to provide the electric motor 30 with an electric current 32 of a variable frequency. In the presently shown embodiment, the electric current 32 that is used for driving the electric motor 30 (and hence the electric current 32 that is provided by the inverter unit 31) is of a three-phase type. In the presently shown embodiment, the inverter unit 31 generates the electric current 32 out of a direct electric current (direct current source not shown in FIG. 6).

The control of the inverter unit 31 is performed by an electronic controller unit 33 that is of a single-board computer type in the presently shown embodiment. Within the block, representing the electronic controller unit 33, another block is indicated that represents an electronic memory 34 in which a program for the actuation of the electric motor 30 via the inverter unit 31 is stored.

It is to be understood that the electric current 32 that is going through the electric motor 30 is not directly controlled by the electronic controller unit 33 and/or the electric inverter unit 31. Instead, a vectorial value for the driving voltage vector 35 is the value that is directly controlled. This value is the output value (voltage vector 35) of the electronic controller unit 33 and hence the input value of the inverter unit 31. The electric current 32 (in particular the presently three phases u, v, w of the electric current 32) contains some "response function" of the electric motor 30, already. Therefore, the electric current 32 can be measured and used as the (usually) main input value of the electronic controller unit 33. Additionally, a user input line 36 is indicated in FIG. 6. This user input line 36 can be used for requesting a certain turning speed or the like. Furthermore some sensors 37 can be foreseen (only schematically indicated in FIG. 6) for collecting additional data. As an example, a sensor 37 can probe for a temperature, the mechanical position of the rotor, the turning speed of the rotor or the like. It is to be understood, however, that according to the presently proposed invention the sole use of the electric current 32 is sufficient for realising a very advanced control of the electric motor 30 and so such additional sensors are typically omitted. The electric motor unit 29 (in particular the electronic controller unit 33) can hence be simple, small and relatively inexpensive.

The measured electric current 32 (where the measurement can be done by current sensors that are presently not indicated) forms the "main" data input source for the electronic controller unit 33. The measured electric current 32 (that is measured in a stationary reference frame and hence varies with time; typically with a sinusoidal shape) is first transformed into the x-y-system (x-y-reference frame; see also FIG. 2; block 40). The x-y-system corresponds to the rotating magnetic field that is created by the stator of the electric motor 30. The x-y-system will rotate with the rotating frequency ω of the driving shaft 38/rotor of the electric motor 30. Because the x-y-system rotates together with the rotor of the electric motor 30, the output currents 39 $i_{sx}$ and $i_{sy}$ are relatively constant with time. In particular, they do not vary with the rotating frequency of the electric motor 30. However, changes that are due to a different rotating speed, a different load on the electric motor 30 or the like are of course still possible.

The calculated electric currents $i_{sx}$, $i_{sy}$ 39 in the x-y-system are passed on to the next logic block 41, where the electric currents are recalculated another time into the d-q-system (see also FIG. 2). The d-q-system (d-q-reference frame) rotates with the same frequency ω as the x-y-system and hence as the rotor of the electric motor 30. However, if a load is applied to the rotating shaft 38 of the electric motor 30, a shift between the x-y-system and the d-q-system will usually occur. As described above with reference to FIG. 2, this shift will manifest itself in form of the so-called load angle 11. Now, we have the electric current 42 (including its various components) in the d-q-system.

In parallel, the measured overall stator current $i_s$ 43 is used and compared with the various user inputs 36. From this, the commanded referencing stator current in d-direction isdRef 44 is calculated in the isdRef calculation block 45.

The value of the commanded reference current 44 is one of the three major input parameters for the stator current controller box 46. The other two crucial parameters are the fraction of the stator current parallel to the x-axis in the x-y-system $i_{sx}$ 39a and the fraction of the stator current parallel to the q-axis in the d-q-system $i_{sq}$ 42a, as can be seen in FIG. 5. The stator current control box 46 calculates a stator current in x-direction that should be present and compares it with the measured stator current in the x-direction $i_{sx}$ 39a. The discrepancy between the calculated and the corresponding measured stator current fraction in x-direction is used to create a voltage error term $u_{Comp}$ 47 that is the main output of the stator current control box 46. This error voltage 47 is used as an input for the voltage vector control box 48, where the voltage vector $u_{sy}$ 35 is calculated. This calculated value of the voltage vector 35 is transferred to the electric inverter unit 31 that is used for driving the electric motor 30.

In the presently shown embodiment, a relevant part of the user input 36 is the reference frequency Wramp 49. This reference frequency Wramp 49 is not only used as an input value for the calculation "box" 45 for the current in d-direction 44, but it is also used for the calculation of the vector angles, which is done in vector angle calculation box 50. In particular, in vector angle calculation box 50, the theta angle 53 (the angle of the voltage vector used by the space vector PWM modulator) is calculated and transferred as an input parameter to the inverter unit 31.

The damping loop 51 is provided to modulate the reference frequency (WsRef) with the power perturbation in order to stabilize the machine. It will not generally be possible to ramp-up a synchronous reluctance machine without this damping loop.

An inductance calculating unit 54 is provided for calculating the d-inductance ($L_d$) and the q-inductance ($L_q$) of the system. These inductances are relevant to the optimum torque angle and are used in the generation of the voltage vector in the voltage vector control box 48.

Additional information can be taken from U.S. application Ser. No. 14/407,493 with the title "Method for controlling a synchronous reluctance electric motor" filed on Dec. 12, 2014 (which application claims priority from GB1210705.8), the entire contents of which are hereby incorporated by reference.

The embodiments of the invention described above are provided by way of example only. The skilled person will be aware of many modifications, changes and substitutions that could be made without departing from the scope of the present invention. The claims of the present invention are intended to cover all such modifications, changes and substitutions as fall within the spirit and scope of the invention.

What is claimed is:

1. A method for controlling an electric motor, the method comprising the step of:
   providing a controller unit comprising:
      a voltage vector control box generating a signal output for controlling an inverter unit to generate a current applied to the electric motor ($i_s$);
      an inductance calculating unit calculating a d-axis inductance ($L_d$) and a q-axis inductance ($L_q$) of the electric motor;
      the voltage vector control box further calculating a torque angle based on at least the current applied to the electric motor ($i_s$), the d-axis inductance ($L_d$) of the electric motor and the q-axis inductance ($L_q$) of the electric motor;
   wherein:
      the torque angle is the angle between the current applied to the electric motor ($i_s$) and the d-axis of the d-q reference frame;
      the controller unit calculating an actuation signal to be provided by the inverter unit to the electric motor to produce the calculated torque angle; and
      the actuation signal controls the electric current applied to the electric motor in the d-direction of the d-q-reference frame ($i_{sd}$).

2. The method according to claim 1, wherein the voltage vector control box calculates the torque angle based on at least one working condition of the electric motor taken from the group comprising required torque, at least one inductance, at least one applied electric current, at least one saturation effect, at least one inductance difference, at least one electric current difference and at least one input command.

3. The method according to claim 2, wherein the torque angle is at least at times and/or at least in part determined by the product of at least two working conditions of the electric motor.

4. The method according to claim 1, wherein the torque angle is at least at times and/or at least in part determined by the product of at least two working condition input signals selected from the group comprising required torque, at least one inductance, at least one applied electric current, at least one saturation effect, at least one inductance difference, at least one electric current difference and at least one input command of the electric motor.

5. The method according to claim 1, wherein the torque angle is determined, at least in part, by a product of at least one multiplicative factor and at least one working condition taken from the group comprising an inductance, a difference in inductance, at least one electric current and at least one difference of electric currents.

6. The method according to claim 1, wherein the torque angle is varied within an interval between 45° as a lower limit and 45°, 46°, 47°, 48°, 49°, 50°, 55°, 60°, 65°, 70°, 75°, 80°, 85° and 90° as an upper limit.

7. The method according to claim 1, wherein a fallback value for the torque angle is used, in particular a fallback value for the torque angle 45°, 46°, 47°, 48°, 49°, 50°, 51°, 52°, 53°, 54° or 55°.

8. The method according to claim 1, further comprising the step of:
   driving a variable frequency electric motor and/or a synchronous electric motor and/or a permanent magnet assisted synchronous reluctance machine and/or a synchronous reluctance electric motor.

9. A controller unit for an electric motor, wherein said controller unit is designed and arranged in a way to perform a method according to claim 1.

10. The controller unit according to claim 9, comprising at least one inverter unit.

11. The controller unit according to claim 9, comprising at least one programmable memory device.

12. An electric motor unit comprising at least one controller unit according to claim 9.

13. The electric motor unit as claimed in claim 12, wherein the electric motor unit is a synchronous reluctance electric motor unit.

14. The method according to claim 1, wherein the torque angle is at least at times and/or at least in part determined by the product of at least two working conditions of the electric motor.

* * * * *